(12) United States Patent
McPheeters et al.

(10) Patent No.: US 11,611,309 B2
(45) Date of Patent: Mar. 21, 2023

(54) FIXED-TILT SOLAR ARRAYS AND RELATED SYSTEMS

(71) Applicant: Ojjo, Inc., San Rafael, CA (US)

(72) Inventors: Greg McPheeters, Santa Cruz, CA (US); Tyrus Hudson, Petaluma, CA (US); Charles Almy, Berkeley, CA (US); Jack West, San Rafael, CA (US)

(73) Assignee: Ojjo, Inc., San Rafael, CA (US)

( * ) Notice: Subject to any disclaimer, the term of this patent is extended or adjusted under 35 U.S.C. 154(b) by 41 days.

(21) Appl. No.: 16/999,866

(22) Filed: Aug. 21, 2020

(65) Prior Publication Data

US 2021/0257962 A1 Aug. 19, 2021

Related U.S. Application Data

(60) Provisional application No. 62/977,894, filed on Feb. 18, 2020.

(51) Int. Cl.
*H02S 20/30* (2014.01)
*F24S 25/617* (2018.01)
(Continued)

(52) U.S. Cl.
CPC .............. *H02S 20/30* (2014.12); *E02D 5/801* (2013.01); *F24S 25/12* (2018.05); *F24S 25/16* (2018.05);
(Continued)

(58) Field of Classification Search
CPC .......... H02S 20/30; H02S 20/10; H02S 20/32; E02D 5/801; F24S 25/12; F24S 25/16;
(Continued)

(56) References Cited

U.S. PATENT DOCUMENTS 686,433 A * 11/1901 Zickefoose ............. E04H 17/10
52/165
1,688,340 A * 10/1928 Marshall ................. E04H 12/10
52/166

(Continued)

FOREIGN PATENT DOCUMENTS

EP 1795829 A2 6/2007
JP 2013157478 A 8/2013
KR 1020170030896 10/2012

OTHER PUBLICATIONS

International Search Report, PCT/US2020/048950, dated Dec. 11, 2020.

*Primary Examiner* — Brian D Mattei
*Assistant Examiner* — Omar F Hijaz
(74) *Attorney, Agent, or Firm* — Phillip D. Mancini

(57) ABSTRACT

Fixed-tilt solar arrays constructed from screw anchors. In some cases, purlins are attached directly to truss legs. In others, they are attached to truss caps joining the free end of each truss leg. In still further ones, screw anchors are driven in rows and interconnected by a pair of hinged members, one of which provides a mounting plane for solar panels. Each screw anchor may serve as a connection point for the trailing hinged member of the first foundation and the leading hinged member of the next foundation. In still further cases, a hinged truss cap may be used to accommodate different tilt angles with the same foundation.

1 Claim, 11 Drawing Sheets

(51) Int. Cl.
*F24S 25/30* (2018.01)
*F24S 25/16* (2018.01)
*E02D 5/80* (2006.01)
*F24S 25/12* (2018.01)
*F24S 25/00* (2018.01)
*F24S 25/60* (2018.01)

(52) U.S. Cl.
CPC ............. *F24S 25/30* (2018.05); *F24S 25/617* (2018.05); *F24S 2025/02* (2018.05); *F24S 2025/6009* (2018.05)

(58) Field of Classification Search
CPC ...... F24S 25/30; F24S 25/617; F24S 2025/02; F24S 2025/6009; F24S 30/425; Y02E 10/47; Y02E 10/50
USPC .................................................. 52/155–166
See application file for complete search history.

(56) References Cited

U.S. PATENT DOCUMENTS

| | | | |
|---|---|---|---|
| 8,609,977 B2 * | 12/2013 | Jones | F24S 30/425 |
| | | | 250/203.1 |
| 9,970,175 B2 * | 5/2018 | Oliver | E04B 1/34347 |
| 2012/0267328 A1 | 10/2012 | McPheeters | |
| 2019/0372514 A1 | 12/2019 | Almy et al. | |
| 2021/0095490 A1 * | 4/2021 | Mattana | H02S 20/30 |
| 2021/0131055 A1 * | 5/2021 | Queen | E02D 27/01 |

\* cited by examiner

FIXED-TILT SOLAR ARRAYS AND RELATED SYSTEMS

CROSS-REFERENCE TO RELATED APPLICATIONS

This claims priority to U.S. provisional patent application No. 62/977,894 filed on Feb. 18, 2020, titled "FIXED-TILT SOLAR ARRAYS SUPPORTED BY TRUSS FOUNDATIONS", the disclosure of which is hereby incorporated by reference in its entirety.

BACKGROUND

Solar energy is one of Earth's largest potential sources of energy. Above the atmosphere, solar irradiance per unit area is 1.361 kilowatts per square meter. At sea level, the usable energy density is reduced to 250 watts per square meter. Using a two-dimensional model to approximate the Earth, 250 watts/square meter$*\pi*6,371,000$ meters$^2$ yields about 32,000 terra (trillion) watts of energy that continuously strikes Earth's surface. Assuming the sun continues to burn and emit photons for a billion more years, the survival of human life ultimately depends on harnessing this essentially unlimited source of clean energy.

The main impediment to widescale solar adoption thus far has been cost. Unlike other energy sources, solar energy costs are frontloaded and fully borne while the operating costs are comparatively low. Fossil fuel-based energy sources require up-front costs as well as pay-as-you-go costs from consuming fuel. Unfortunately, the consequential costs of energy generated from fossil-fuel sources are not are not reflected in the sales price. Coil and oil-based energy sources have significant external costs stemming from $CO_2$ emissions that, in the absence of a carbon tax, are not reflected in the cost. In addition, entrenched utilities and fossil fuel producers have lobbied effectively to stymie the progress of solar, even in states with the greatest solar potential.

Notwithstanding these headwinds, the cost of manufacturing solar panels has now dropped low enough that even when coupled with energy storage, solar power plants are now equivalent to or less expensive than coal, oil, and even natural gas. In the context of the electricity market, the relative cost difference between competing sources is quantified in terms of the cost per unit, typically a kilowatt hour (kWh). Large scale solar arrays, so called "utility-scale" arrays, may have tens to hundreds of megawatts of power generating capacity, putting them on the same scale as small coal and natural gas-fueled power plants. These arrays usually generate power that is fed into the grid and sold at wholesale prices on the order of a few cents per kWh. The development of utility-scale solar projects is funded with so-called power purchase agreements (PPAs). With a PPA, an off taker (e.g., utility, grid operator, etc.) agrees to purchase all the power generated by the system at a fixed rate for the operational life of the array (e.g., 30 years). This enables a bank or other investor to accurately value the predicted future revenue stream and to loan money against it to finance construction of the array.

Utility-scale solar power plants are predominantly configured as fixed-tilt ground mounted arrays or single-axis trackers. Fixed-tilt arrays are typically arranged as East-West oriented rows of panels tilted South at an angle dictated by the latitude of the array site—the further away from the equator, the steeper the tilt angle. By contrast, single-axis trackers are installed in North-South running rows with solar panels attached to a rotating axis called a torque tube that keeps the panels on-sun by moving them from an East-facing orientation to a West-facing orientation throughout the course of each day, following the sun's progression through the sky. For purposes of this disclosure, both fixed-tilt and single-axis trackers are referred to collectively as axial solar arrays.

The applicant of this disclosure has developed a novel truss-based foundation system for supporting single-axis trackers among other structures. Conventionally these system have been supported by monopile foundations consisting of rows of I-beams or H-piles beaten into the ground with impacting or vibratory hammers. Known commercially as EARTH TRUSS, it typically consists of a pair of adjacent screw anchors driven into the ground at angles to one another about either side of an intended North-South tracker row. Upper leg sections are attached to the end of each screw anchor and a so-called truss cap has a pair of connecting portions that are received into the open end of each upper leg to complete the truss assembly. Connections between the screw anchors and upper leg sections and between the latter and the truss cap may be made with a crimping device or other suitable tool, or, alternatively, with bolts, screws, rivets, or other suitable fasteners. Tracker components such as the bearing housing assembly or bearing assembly are typically attached to the truss cap, enabling the EARTH TRUSS to be compatible with several different types of commercially available single-axis trackers.

Relative to conventional monopile foundations, the EARTH TRUSS distributes lateral loads more efficiently and therefore allows trackers to be supported with less steel. Lateral loads are translated into monopile foundations as a bending moment whereas in the EARTH TRUSS, they are translated into the truss legs as axial forces of tension and compression. As a result, the legs may be smaller than an equivalent H-pile and driven to shallower depths. While the truss geometry provides certain benefits when used to support single-axis trackers, the EARTH TRUSS components are also very adaptable to form fixed-tilt tracker arrays that can be quickly and securely assembled with very few components, providing similar load distribution benefits as well as an opportunity to merge the foundation and array into a single-structure. To that end, various embodiments of the invention provide efficient, inexpensive, and rapidly installable fixed-tile solar arrays incorporating EARTH TRUSS foundation components.

DETAILED DESCRIPTION

The following description is intended to convey a thorough understanding of the embodiments described by providing a number of specific embodiments and details involving fixed-tilt solar arrays constructed with A-frame shaped truss foundations. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
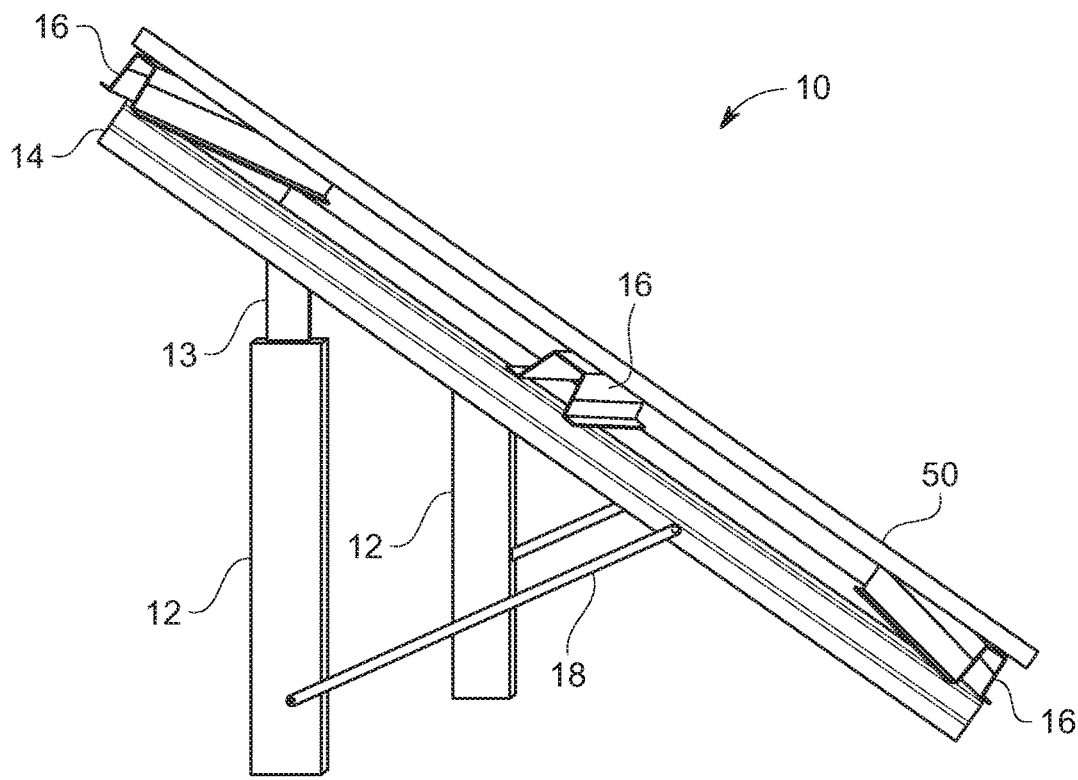
FIG. 1A shows a fixed-tilt solar array known in the prior art.
Figure 1B:
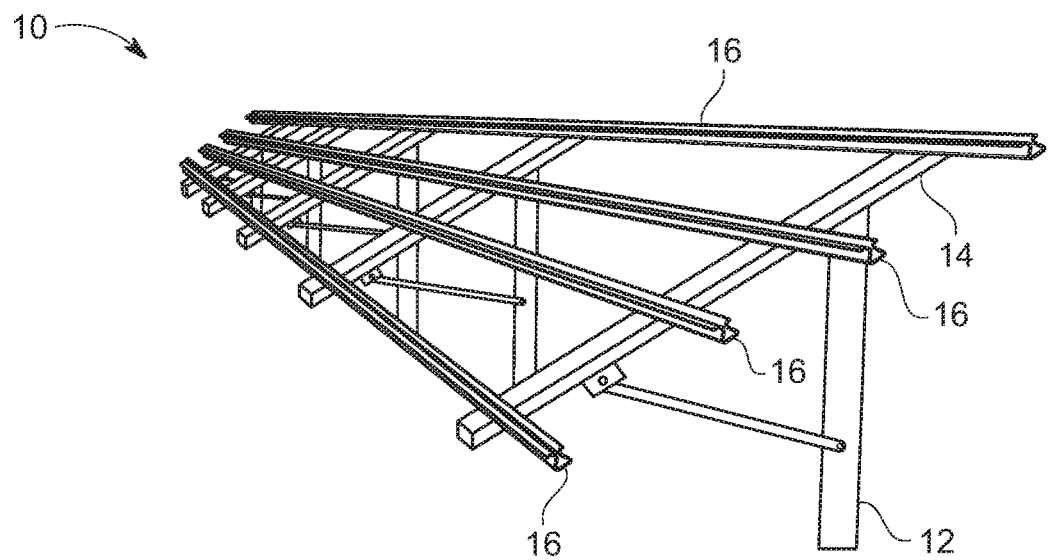
FIG. 1B shows another fixed-tilt solar array known in the prior art.

FIG. 1A shows a conventional fixed-tilt solar array 10 representative of that manufactured and sold by Schletter Solar GmbH. The array consists of a pair of foundation members 12 driven into the ground plumb and a rail assembly 14. Rail assembly 14 includes member 13 that connects to one of the vertical foundation members 12 and cross brace 18 that supports the cantilevered portion of rail assembly 14 by bracing to foundation member 12. Purlins 16 lay orthogonally across rail assembly 14 extending to an adjacent foundation member 12 and rail assembly 14 in the same East-West row. The number of purlins 16 may vary from two to four depending on the configuration of the array (e.g., one panel in portrait, two panels in portrait, two panels in landscape, etc.). Purlins 16 bridge the distance between two or more adjacent foundations and provide a scaffold on which to attach rows of solar panels 50. Typically, clamps or other like fasteners are used to enable rapid installation of panels 50 to purlins 16. The system shown in 1B is similar to that of 1A but includes an additional purlin to accommodate more solar panels. Although system 10 resembles that of Schletter, several other companies manufacture and sell similar looking systems that rely on a single ground penetration per foundation with a cantilevered frame supported by a cross brace such as brace 18 shown in these figures. The Schletter system shown here purports to offer simplified installation relative to at least some of those systems because the components of rail assembly 14, including member 13 and cross brace 18, come preassembled.

Figure 2A:
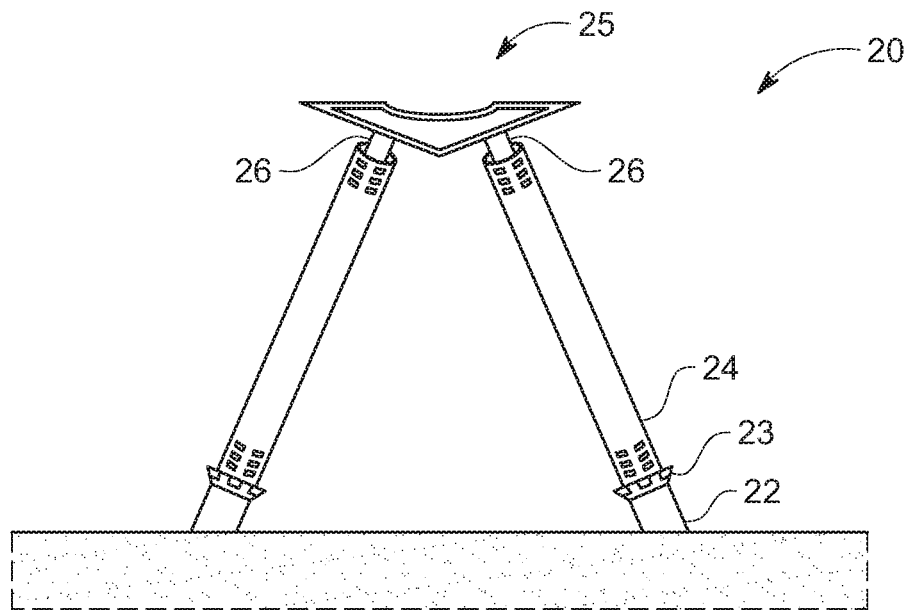
FIG. 2A shows a truss foundation usable with various embodiments of the invention.
Figure 2B:
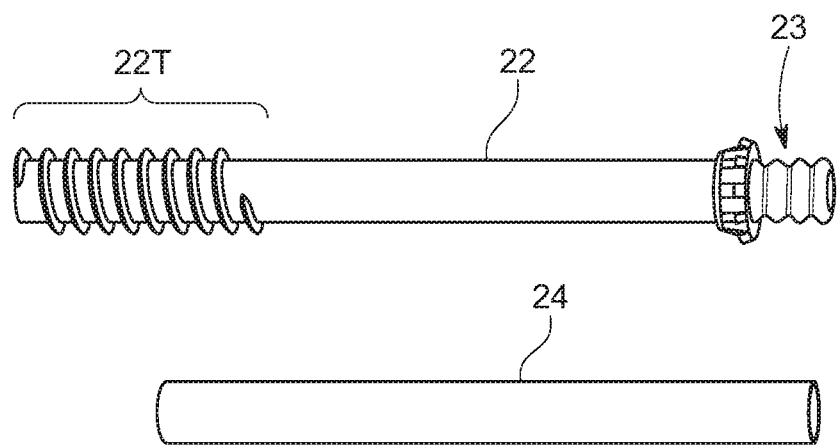
FIG. 2B shows components of the truss foundation of FIG. 2A.

Turning now to FIGS. 2A and B, as discussed above in the background section, the applicant of this disclosure has developed a novel foundation system initially commercialized to support single-axis trackers. System 20, known as EARTH TRUSS, is shown in FIGS. 2A and B. System 20 consists of a pair of adjacent truss legs that are driven at an angle towards one another and oriented about an intended North-South line of a tracker. Each leg consists of screw anchor portion 22 driven into the ground and joined at its above-ground end by upper leg section 24. These components are shown in greater detail in FIG. 2B. Screw anchor 22 is an elongated hollow steel tube with an external thread form 22T at the lower end that extends some distance up the shaft with driving coupler 23 at the upper end. In various embodiments, driving coupler 23 has teeth-like features that are engaged by the chuck of a rotary driver. After the screw anchor is driven to the desired embedment depth, leaving only a fraction of the total length above-ground, the portion of coupler 23 extending upward is used to attach upper leg section 24. In various embodiments, upper leg 24 is simply sleeved over this portion of coupler 23 to complete the truss leg.

Continuing with FIG. 2A, the free ends of each upper leg section 24 are joined together with a structure designated herein as truss cap or adapter 25. In various embodiments, truss foundation 20 is completed when connecting portions 26 projecting from the lower portion of truss cap 25 are inserted into each leg. In various embodiments, these connecting portions have a geometry similar to the top portion of driving coupler 23 to facilitate a crimped joint between them and their respective upper leg sections 24. The machine used to drive screw anchors 22 may have an alignment jig or other structure that holds truss cap 25 at the proper orientation to insure alignment with other truss caps in the same row since the machine has already achieved the desired orientation before driving screw anchors 22. Then, upper leg sections 24 may be sleeved over their respective couplers 23 and connecting portion 26 so that the upper leg can be crimped into place, preserving the truss cap's proper alignment. In various embodiments, connecting portions are long enough to enable upper leg sections 24 to be sleeved over them and provide clearance for the lower end of the upper leg to be sleeve over connecting portion 23. Once the desired geometry is achieved, all sleeved connections may be locked into place with a crimping tool. Indentations circumscribing couplers 23 and connection portions 26 may facilitate deformation when upper leg sections 24 are crimped over them. It should be appreciated, however, that other connections may be used instead of crimping for the connection between upper leg section 24 and coupler 23, and between connecting portions 26 of truss cap 25 and the upper legs.

When supporting a single-axis tracker, a bearing assembly or bearing housing assembly, or motor may sit on top of truss cap 25. A typical tracker row will include several such trusses and bearing adapters spanning as much as 300 feet with spacing between trusses typically on the order of 20 to 30 feet. As discussed above, one advantage of truss foundations relative to monopile foundations is that they convert gravity loads and lateral loads due to wind into axial forces of tension and compression in the truss legs rather than bending. While useful for single-axis trackers, this approach provides similar benefits to fixed-tilt solar arrays. In a fixed tilt array, a support structure is constructed that orients the solar panels at a fixed angle with respect to the sun, typically so that they are leaning toward the equator at a designated tilt angle. The particular tilt angle chosen will depend on the latitude the array is located at; the ideal angle becomes flatter closer to the equator. In some cases, the below ground components of the array are part of the system and in others they merely provide attachment points for the proprietary above-ground fixed-tilt system.

Figure 3:
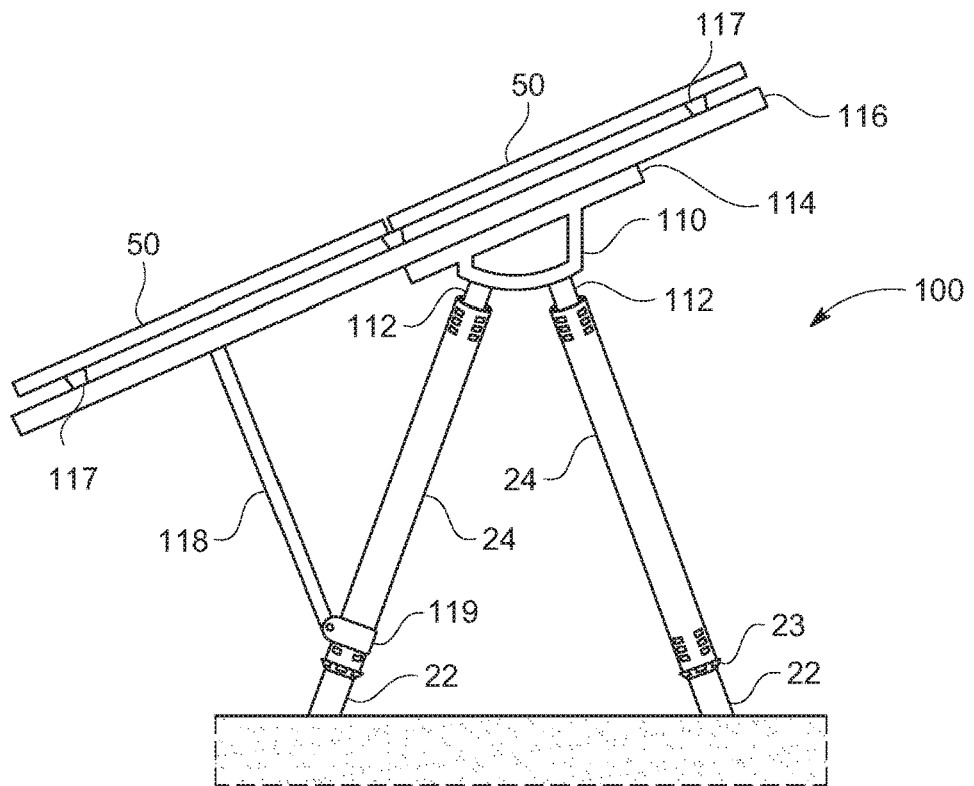
FIG. 3 shows a fixed-tilt solar array according to various embodiments.

Turning now to FIG. 3, this figure shows exemplary fixed-tilt array 100 according to at least one embodiment. The truss foundation supporting array 100 is similar to that shown in FIG. 2A. Each leg consists of driven screw anchors 22 and upper leg sections 24 joined along a substantially common axis. Instead of symmetric truss cap 25 shown in FIG. 2A, truss cap 110 in this embodiment is asymmetric. Connecting portions 112 are received in respective ones of upper leg sections 24 at substantially the same height, however, upper support member 114 at the top of truss cap 110 is angled, in this example, at the desired tilt angle of the fixed-tilt array. Support rail 116 is attached to truss cap 110 via support member 114 using clamps, brackets, screws, bolts, or other suitable mechanical fasteners. Support rail 116 may consist of a length of standard structural steel such having an L-shaped, C-shaped, boxed, or other suitable profile. Purlins 117 are laid orthogonally across support rail 116, extending from the current rail to the corresponding rail on the next adjacent truss foundation to provide a platform on which to attach solar panels 50. Leg brace 118 interconnects support rail 116 to the front truss leg via leg bracket 119. In some embodiments, brace 118 may be hinged to rail support 116. In others, it may be connected to support rail 116 onsite. In various embodiments, brace member 118 is also connected to leg clamp 119 via a hinge to accommodate different tilt angles. With this geometry, wind incident on solar panels 50 will create forces that are translated into axial forces of tension and compression in the truss legs. Brace 118 prevents forces on the cantilevered portion of support rail 116 from putting a moment on the truss formed by the legs and truss cap 110. In this example, array 100 has three purlins 117 and is configured as two modules in either portrait or landscape.

Figure 4:
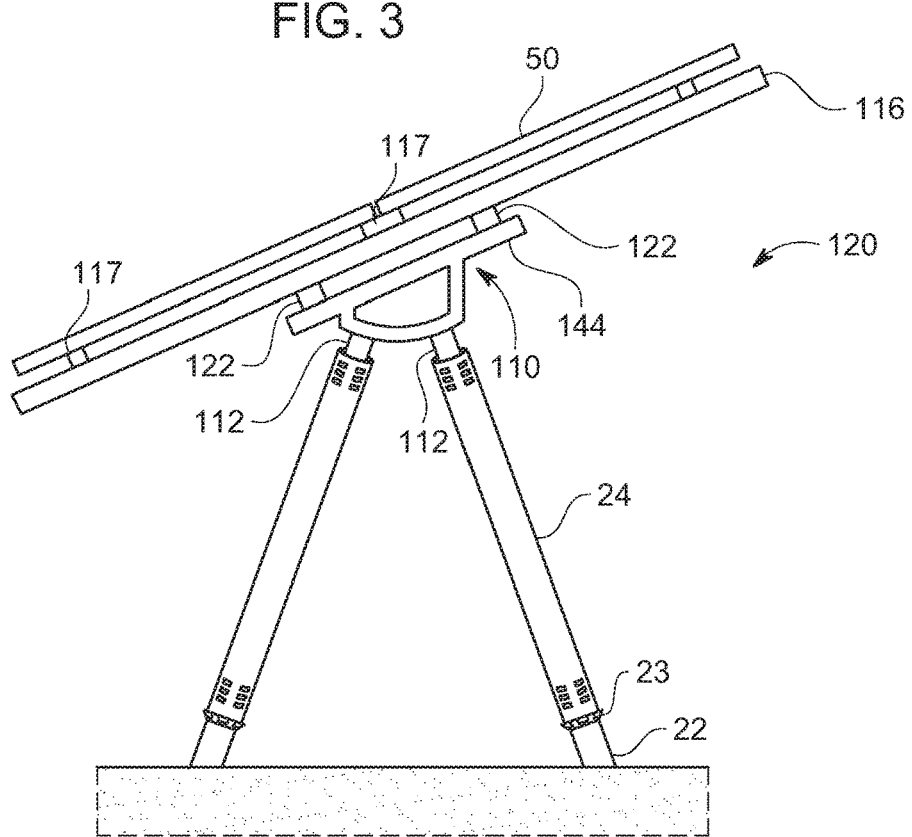
FIG. 4 shows another fixed-tilt solar array according to various embodiments.

FIG. 4 shows another exemplary fixed-tilt array 120 according to at least one embodiment. The truss foundation supporting array 120 is substantially the same as array 100 shown in FIG. 3. The truss legs and truss cap 110 are the same. The difference lies in the fact that weight is distributed evenly about support member 114 by support rail 116 which, in this case, is centered about support member 114 so that forces are spread evenly on either side of truss cap 110. Purlins 117 extend orthogonally across rail 116 to the rail on the next adjacent foundation to provide a platform for attaching solar panels 50. In this embodiment, brace 118 has been eliminated by distributing the weight evenly on the lower and upper sides of the truss cap 110. In various embodiments, additional braces may be added extending from opposing ends of rail 116 down to respective ones of the truss legs, for example, in areas subject to high winds or where multiple panels are supported (e.g., two panels in portrait). Alternatively, cables may be used to accomplish this. It should be appreciated that in various embodiments, a single module in portrait or landscape may also be used in system 120 rather than the two panels shown in the exemplary figure.

Figure 5A:
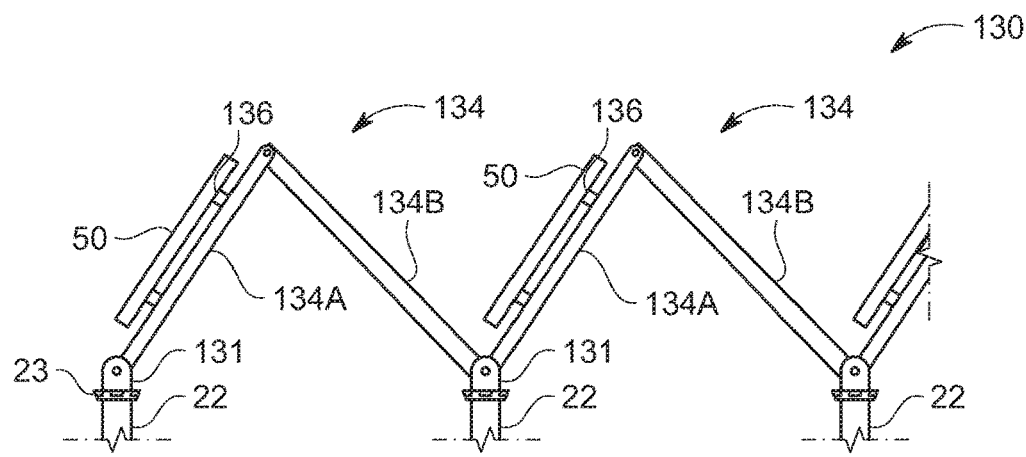
FIG. 5A shows a further fixed-tilt solar array according to various embodiments.
Figure 5B:
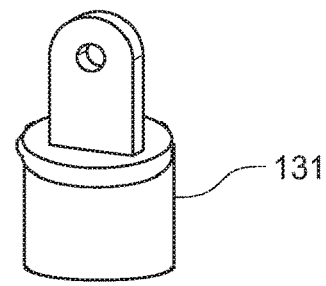
FIG. 5B shows a component of the fixed-tilt solar array of FIG. 5A.
Figure 6A:
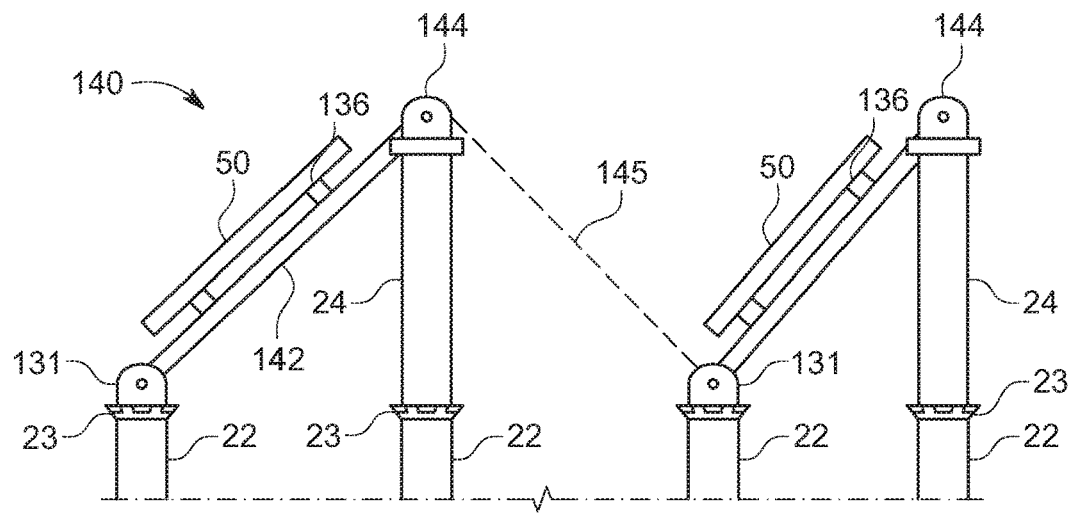
FIG. 6A shows an additional fixed-tilt solar array according to various embodiments.

Turning now to FIGS. 5A and 6A, these figures show two South-facing fixed-tilt arrays 130, 140 respectively, with a repeating sawtooth shaped configuration. Starting with array 130 shown in FIG. 5A, construction begins by driving a series of plumb screw anchors 22 in rows across the array site. The view of 5A is West facing with the array facing South. Screw anchors 22 terminate with driving coupler 23. However, instead of sleeving an upper leg over the couplers 23, hinge cap 131 is sleeved over them. Hinge cap 131, is shown, for example, in FIG. 5B. Hinge cap 131 has a hinge flange projecting above it and an open receiving tube below it. In various embodiment, the tube is sleeved over one of the driving couplers and crimped in place. To assemble the array, a pin is inserted into the flange to attach one end of hinge assembly 134. Assembly 134 consists of front section 134A and rear section 135, joined to one another via a hinged connection so as to make a saw-tooth-shaped profile when connected to span between two adjacent hinge couplers 131 in the North-South direction (assuming that section 134A faces South). The steel making up hinge assembly 134 may be a standard form such as L-bracket, C-channel, Z-strut, or other suitable form. In various embodiments, front section 134A is shorter than rear section 134B to enable it to be oriented at a steeper tilt angle than rear section 134B. For given lengths of front and rear sections 134A/B, the tilt angle may be set by the spacing between adjacent screw anchors. For example, as the distance between adjacent screw anchors 22 increases, the tilt angle of front section 134A will reduce. This will make it very easy to adjust the tilt angle without changing any hardware by simply increasing or decreasing the screw anchor spacing in the North-South direction, that is, from row to row. In various embodiments, a pin may be inserted into each hinge cap 131 to retain sections 134A and 134B. As seen, in the figure, other than in the first and last South-facing rows, each hinge cap 131 may support rear section 134B of one hinge assembly 134 and front section 134A of the next successive hinge assembly 134 of the next row, that is, front to back, across the array. Purlins 136 may extend orthogonally across front section 134A of one hinge assembly to the next adjacent one running East or West, that is, into or out of the page. Solar panels 50 are then attached to the purlins. The number of purlins 136 used will depend on the configuration of the array.

Figure 6B:
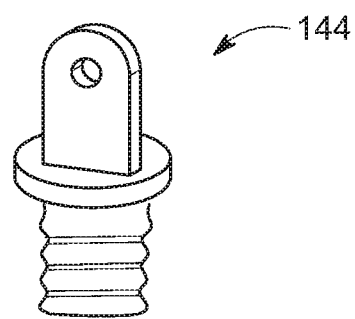
FIG. 6B shows a component of the fixed-tilt solar array of 6A.

Turning to fixed tilt-array 140 of FIG. 6A, the array is again constructed from a series of plumb driven screw anchors 22. The view of 6A is West facing with the array facing South. The first screw anchor 22 of the two-anchor pair in each row is capped with hinge cap 131, such as that shown in FIG. 5B. However, the second receives upper leg section 24 that serves as the back brace of the fixed-tilt array. Then, crimp hinge cap 144 is inserted into the open end of upper leg section 24 so that upper leg section 24 may be crimped around it. Crimp hinge cap 144 is shown in greater detail in FIG. 6B. In some embodiments, upper leg section 24 will be crimped around crimped hinge cap 144. In other embodiments, crimped hinge cap 144 may be attached to upper leg section 24 at the time of manufacture, eliminating the need for this step. In each row, support rail section 142 interconnects hinge cap 131 to crimp hinge cap 144, thereby setting the tilt angle of the array. In various embodiments, pins are used to make this connection. In other embodiments, a different fastening mechanism may be used such as bolts, screws, or other suitable fasteners. In various embodiments, the length of upper leg section 24 will set the array's tilt angle, making it very easy to adjust tilt angle for different latitudes. This can be accomplished by using different length upper legs, or alternatively by controlling the reveal of the second driven screw anchor, that is, the length of the portion remaining above ground after the target embedment depth is reached. As with other embodiments, purlins 146 are laid orthogonally across support rail section 142 to the next adjacent rail section in the East-West direction. Solar panels 50 are then attached to the purlins using one of many commercially available connectors. This alternating high-low pattern runs South to North to form each row of the array with row-to-row spacing set to eliminate shading. In cases where winds are high, it may be necessary to brace the rear leg of each foundation to the front leg of the next foundation, as indicated by dotted line 145 in the figure. This may be done with a cable or rigid support.

Figure 7A:
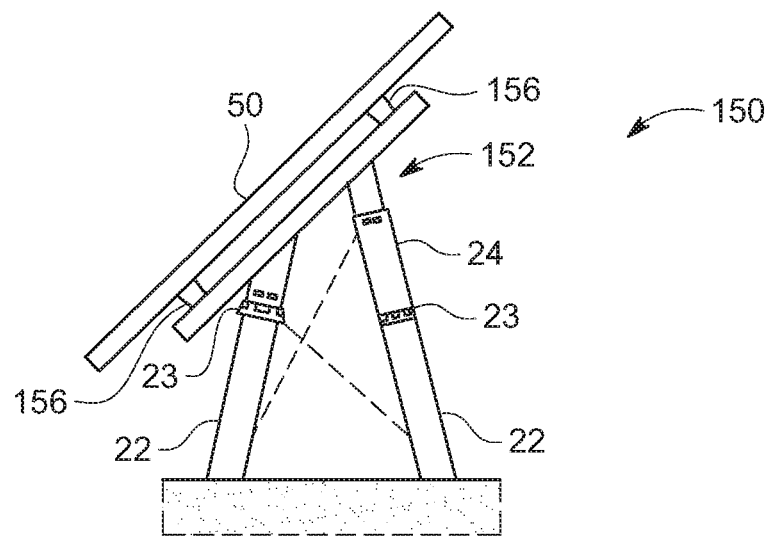
FIG. 7A shows yet another fixed-tilt solar array according to various embodiments.
Figure 7B:
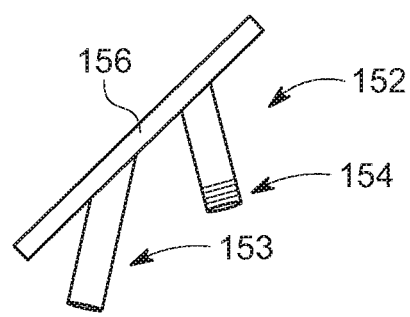
FIG. 7B shows a component of the fixed-tilt solar array of 7A.

FIG. 7A shows an additional fixed-tilt array 150 according to various embodiments. Array 150 consists of a pair of screw anchors 22 driven at angles to one another and joined together with truss cap 152. Truss cap 152 is shown in greater detail in FIG. 7B. Anchors 22 may be of two different lengths so that they can be driven to the same embedment depth but have different reveals (above-ground distances). This may eliminate the need for additional upper leg sections and their corresponding connections. Alternatively, as shown, the rear leg may consist of a screw anchor and upper leg section 24 joined via driving coupler 23. Truss cap 152 has a pair of connecting portions 153, 154. Connecting portion 153 is sleeved over coupler 23 like a section of upper leg. Coupler 24 is inserted into upper leg portion 24 and the upper leg is crimped around it and its corresponding coupler 23 thereby joining the truss legs to form an offset A-frame-shaped truss structure. Purlins 156 are laid orthogonally across and attached to support 156 of truss cap 152, extending to the truss cap of the next adjacent foundation. In addition, crisscrossed cable supports may extend from the top of one leg, or the truss cap, to the lower end of the opposing leg.

Figure 8:
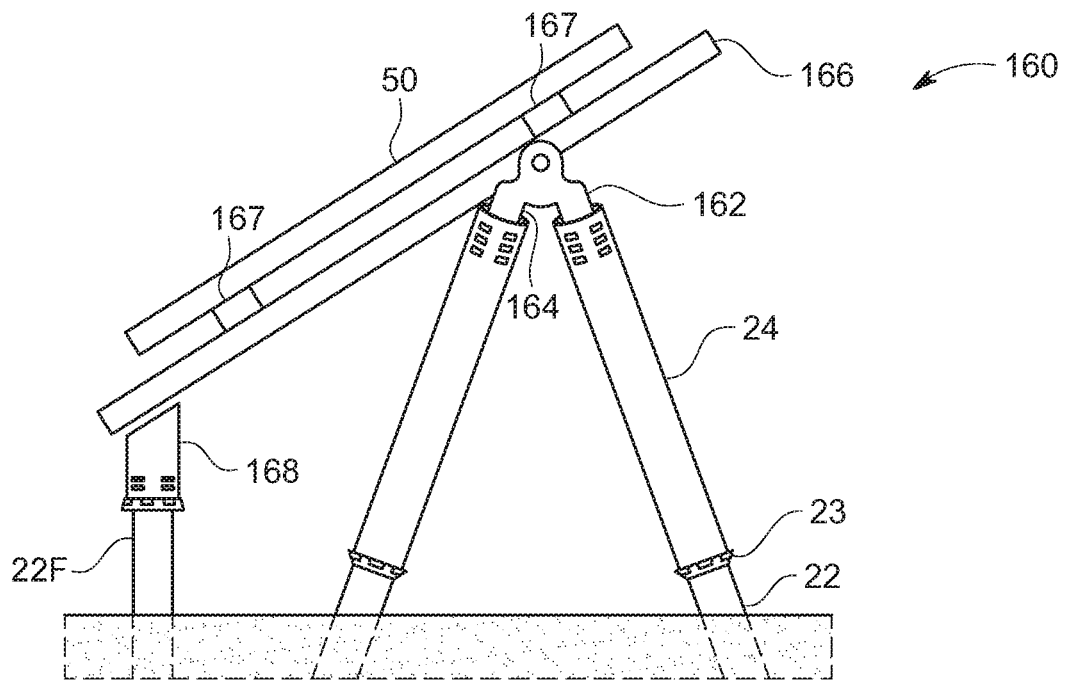
FIG. 8 shows another fixed-tilt solar array according to various embodiments.
Figure 9:
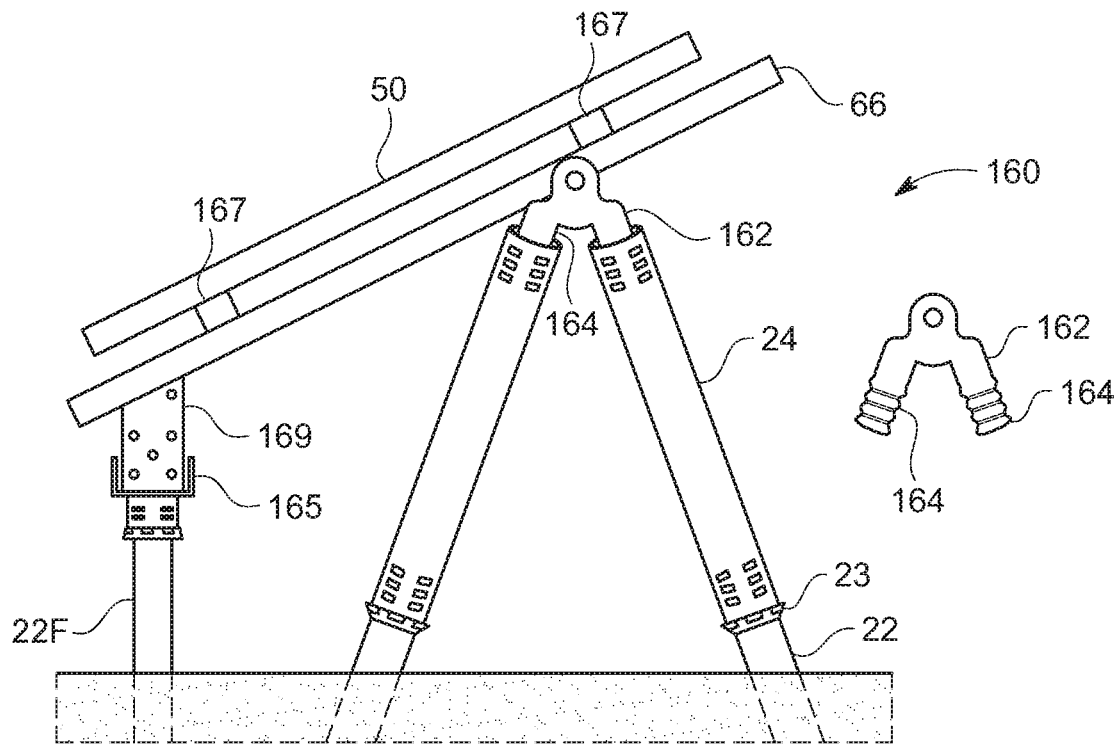
FIG. 9 shows a modified version of the fixed-tilt solar array of FIG. 8.

FIGS. 8 and 9 show different versions of another fixed-tilt array 160 according to various embodiments. The legs of the truss foundation of array 160 are formed from screw anchors 22 and upper leg portions 24 joined via driving couplers 23. Truss cap 162 joins the free ends of each upper leg portion 24 to form a unitary truss structure. Truss cap 163 includes a pair of connecting portions received in respective upper legs 24. As shown, screw anchors 22 are driven at reciprocal angles to one another (e.g., ±70-degrees), however, this is not necessary. In some embodiments, the front screw anchor (i.e., South-facing) may be driven at a steeper angle. Truss cap 162 has a hinged connection to support rail 166. The hinged connection allows truss cap 162 to accommodate an infinite number of different tilt angles with the same assembly. In array 160, additional screw anchor 22F is driven plumb some distance in front of the front truss leg. In FIG. 8, this anchor is caped with rest 168. Rest 168 is simply a section of tube with an angle set to approximate the tilt angle of the array. It may be closed at the upper, angled end while the open lower end is sleeved over driving coupler 23 at the head of screw anchor 22. Support rail 166 extends from truss cap 162 down to the angled upper surface of rest 168 with gravity holding it in place. Alternative, a clamp, screw, bolt, or other suitable fastener may be used to form a connection between support rail 166 and the top of rest 168. Purlins 167 are laid orthogonally across support rail 166 extending Westerly (i.e., in to the page) to the support rail of the next adjacent foundation.

In FIG. 9, rest 168 is replaced with ballast support 165 and ballast block 169. In some embodiments, ballast block 169 may attach to support rail 166 to prevent wind from lifting up the array about hinged truss cap 162. Alternatively, gravity may hold it in place. Because the connection between support rail 166 and truss cap 162 is not a moment connection, there will not be any moment experienced by the truss, even in the event that wind blows the panels up off of rest 168 or block 169. Ballast support 165 may have a circular opening at its lower end that is sleeved over driving coupler 23 of front screw anchor 22F, and a U or cup shaped opening on its upper end enabling ballast block 169 to be dropped inside to provide a rest for the lower edge of support rail 166. A rubber cap or other structure may be placed between support rail 166 and the block 169 to prevent damage. As with the version shown in FIG. 8, purlins 167 are laid orthogonally across support rail 166, extending Westerly to the next adjacent support rail so that solar panels 50 can be attached in the space in between.

Figure 10A:
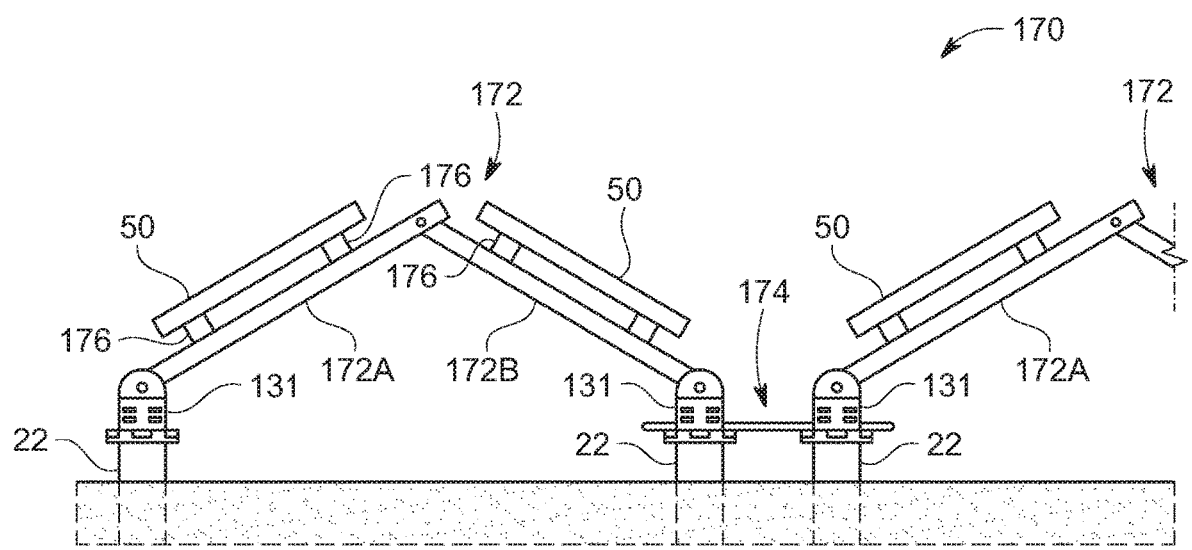
FIGS. 10A and 10B show different views of an East-West oriented fixed-tilt array according to various embodiments.
Figure 10B:
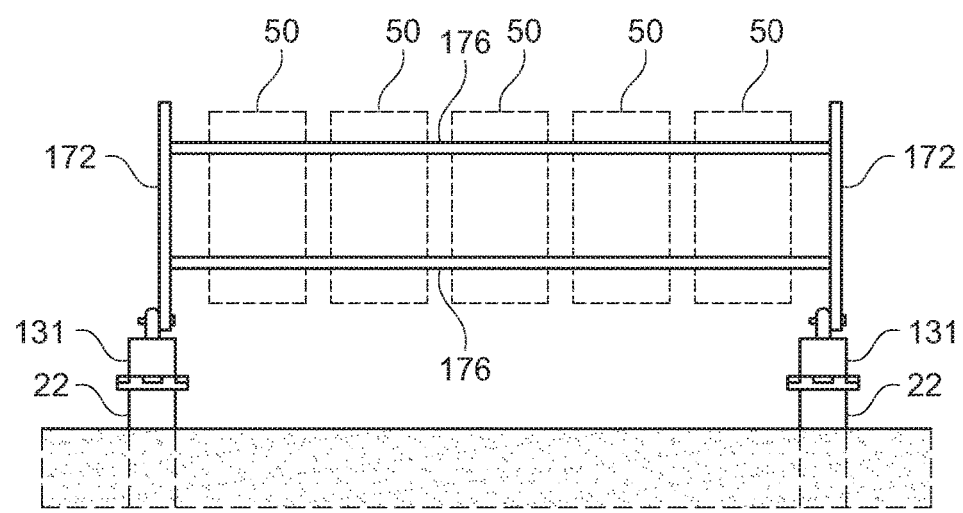

Turning now to FIGS. 10A and B, these figures show an East-West oriented saw-tooth shaped fixed-tilt array 170. Unlike other fixed-tilt arrays, East-West oriented arrays are characterized by low tilt angles and instead of being tilted South, are instead oriented in a saw-tooth pattern extending from East to West. In some cases, each row may have some slight South-leaning tilt but primarily the array is arranged to optimize energy harvest as the sun moves from East to West through the sky without moving components. FIG. 10A shows array 170 from a North-South perspective whereas 10B shows array 170 from the East or West. Array 170 is constructed from rows of plumb-driven screw anchors 22. Each row consists of a pair of plumb driven screw anchors driven so as to extend slightly above ground (e.g., ~1 foot). Once driven, hinge cap 131 is crimped to the head of each anchor. Hinged cap 131 is similar to that shown in FIGS. 5A and 5B. Hinged rail assembly 172 consists of interconnected sections 172A and 172B that are connected at opposing ends to two adjacent hinged couplers 131 in the same row to form a saw-tooth shaped structure in the East-West direction. In various embodiments, 172A and 172B are substantially the same length so that they make reciprocal angles (e.g., ±15-degrees). Purlins 176 are laid orthogonally across sections 172A and 172B to the next adjacent rail assembly. Solar panels 50 may then be attached to purlins 176 across sections 172A and 172B to harvest energy as the sun moves from East to West in the sky each day.

In some embodiments, spacing may be introduced between adjacent East-West sections of the array to enable workers to walk through during installation and for maintenance and/or repair. This is seen for example, in FIG. 10A. To that end, an interrow connector such as connector 174 may be used to join the adjacent screw anchors of one row with screw anchors of the next adjacent row, enabling forces to be distributed across rows while setting a spacing between consecutive rows. Connector 174 may consist of a piece of flat plate with a pair of holes or slots sized to fit between the head of the screw anchor and the pinned connectors. Hinge cap 131 may hold connector 174 in place. Alternatively, connector 174 may be eliminated and every screw anchor but the first and the last may support second section 172B of one hinge assembly and first support section 172A of the next adjacent hinge assembly in the same row, thereby eliminating the spacing between consecutive rows.

Figure 11:
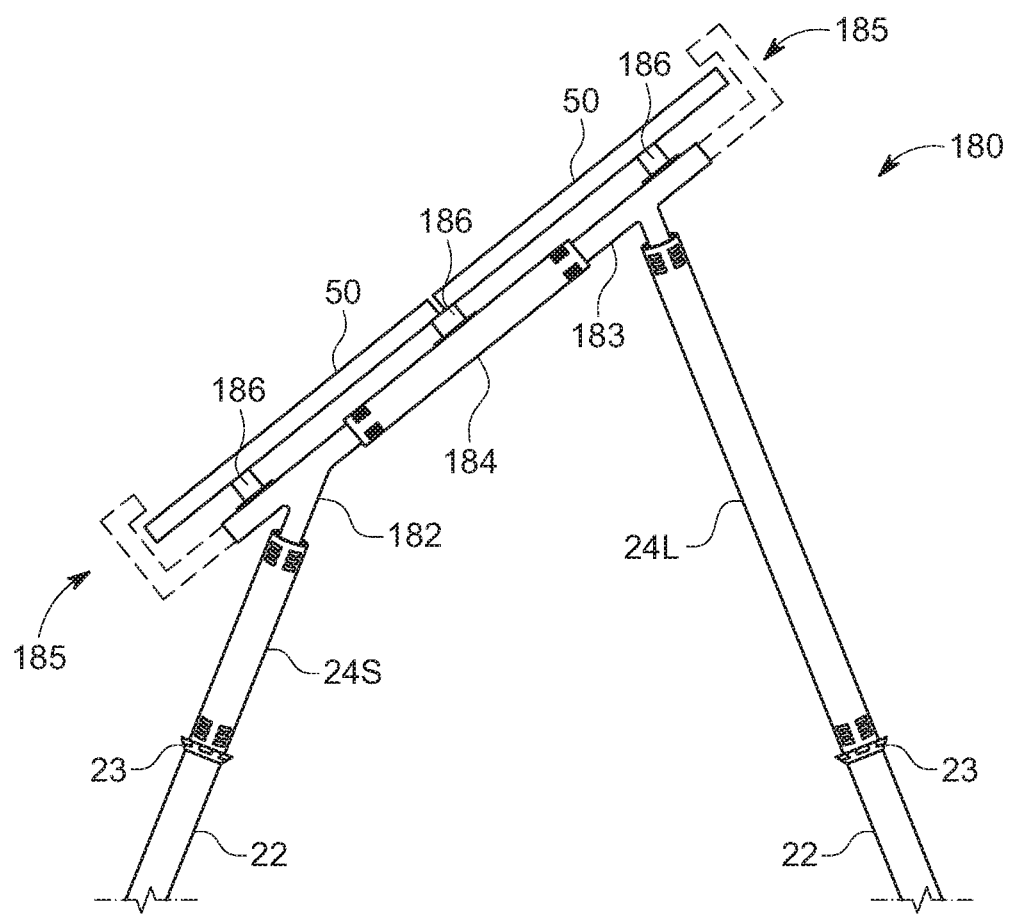
FIG. 11 shows another fixed-tilt solar array according to various embodiments.

Turning now to FIG. 11, this figure shows fixed-tilt array 180 according to various embodiments. Array 180 consists of a pair of truss legs spaced apart and driven into the ground at angles to one another and extending different distances above ground. Front and back truss legs are formed from screw anchors 22 and respective short and long upper leg sections 24S, 24L joined axially via driving couplers 23. In various embodiments, a straight line from the top of short upper leg section 24S to long upper leg section 24L will represent the tilt angle of the fixed-tilt array. In various embodiments, an upper support structure consisting of lower and upper truss cap portions 182 and 183 are interconnected by support tube section 184. In various embodiments, the connections between portions 182 and 183 to their respective upper leg sections 24S, 24L and to tube section 184 are crimp connections made by sleeving one deformable portion over a solid portion of the other. This enables adjustments to be made to all components at the time of installation to insure alignment before locking the elements together to form a rigid truss assembly. Once the truss is constructed, purlins 186 are laid orthogonally across truss cap portions 182, 183 and if necessary, support tube 184, and extending to those corresponding components in the next adjacent truss. Solar panels 50 are then attached to purlins 50. As shown by dotted lines, one or both of truss cap portions 182 and 183 may include hooked ends 185 to provide further support for panels 50. In various embodiments, assembly 180 is repeated along multiple adjacent East-West lines to form a series of South-facing array rows. Interrow spacing is dictated by the configuration of the array and tilt angle.

Figure 12:
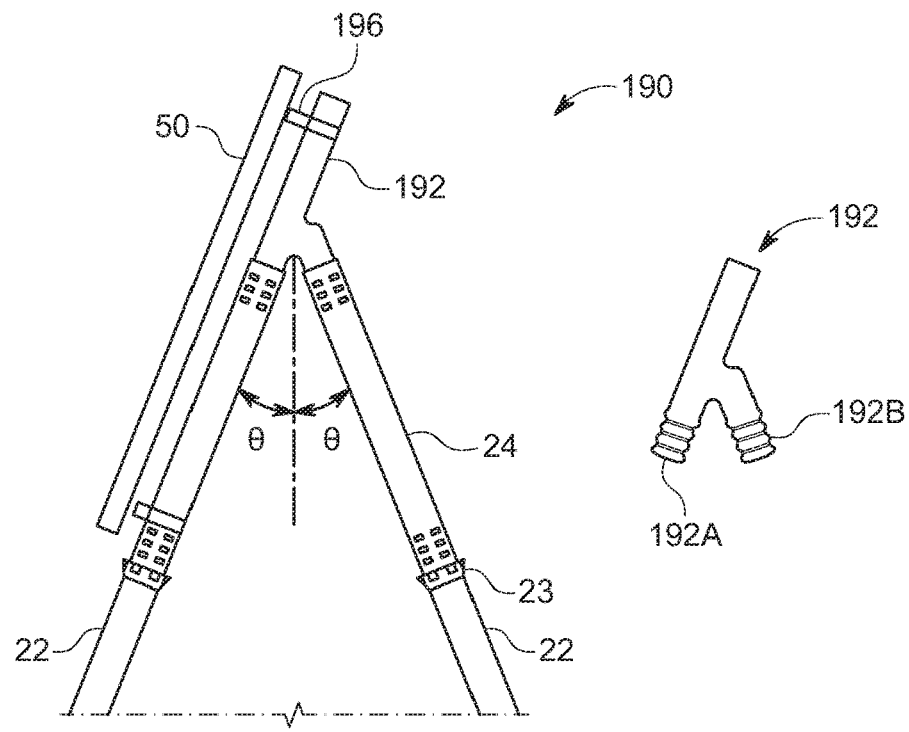
FIG. 12 shows a further fixed-tilt solar array according to various embodiments.

FIG. 12 shows another fixed-tilt array 190 according to various embodiments. Array 190 is constructed from a pair of adjacent truss legs spaced apart and driven at angles to one another to approximately the same height. Each leg in array 190 consists of screw anchor 22 and upper leg portion 24 joined via driving coupler 23. As shown, both are driven at the same angle Θ with respect to a midline between them, however, in some embodiments, the front leg, that is the one closest to panels 50, may be driven at a relatively steeper angle than the rear leg. In array 190, the angle of the front leg dictates the tilt angle of the array. In various embodiments, truss cap 192 joins the free ends of each upper leg 24. Truss cap 192 has a pair of connecting portions 192A and B, received within respective ones of upper leg portions 24. Connecting portion 192A extends linearly along the main body of truss cap 192 while connecting portion 192B is separated from portion 192A by the angle between them, in this case, 2*Θ. Purlins 196 are attached to front truss leg via straps, clamps, or other suitable fasteners.

Figure 13:
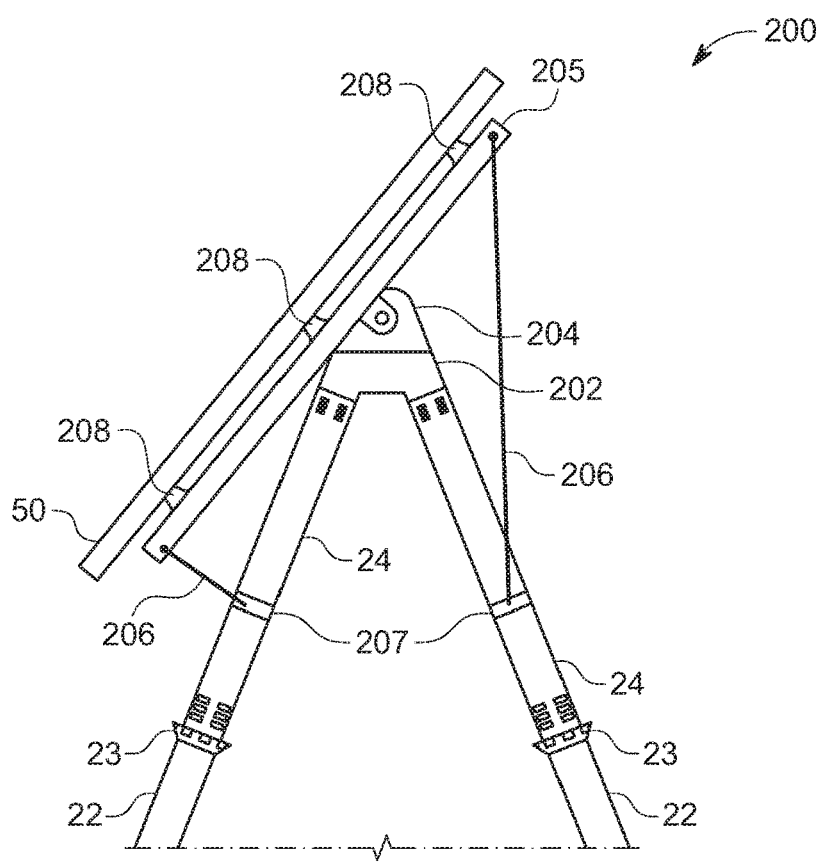
FIG. 13 shows another fixed-tilt solar array according to various embodiments.

FIG. 13 shows another fixed-tilt array 200 according to various embodiments. As with the array shown in other embodiments, array 200 is also built on a pair of spaced apart truss legs driven to be angled towards one another. The legs are similarly constructed to array 190 of FIG. 12, consisting of upper leg portions 24 joined to screw anchors 22 via driving couplers 23. The truss legs in this embodiment, do not need to be driven at the tilt-angle of the array. Rather, they may be driven to a suitable angle between 55-degrees and 72.5 degrees to optimize the translation of loads into the truss legs. The free end of each upper leg section 24 is joined with truss cap 202. As with other truss caps shown herein, truss cap 202 has a pair of connecting portions that are received within respective one of upper legs sections 24. Hinge assembly 204 sits on top of truss cap 202. This assembly may be a separate structure or, alternatively may be attached to and/or part of truss cap 202. Hinge assembly 204 includes a hinged connection to support rail 205 so that rail 205 may be oriented at different tilt angles depending on the latitude and configuration of the array. Cables 206 may be used to connect opposing ends of rail 205 to respective ones of truss legs via leg clamps 207. Alternatively, solid members may be used for this purpose. In various embodiments, leg clamps 207 include teeth or other projections that depress into and/or penetrate the upper leg portions 24 when the clamps are tightened down, preserving the tension in each cable and the tilt angle of the array. This enables the same assembly to be used at a variety of different tilt angles.

Figure 14:
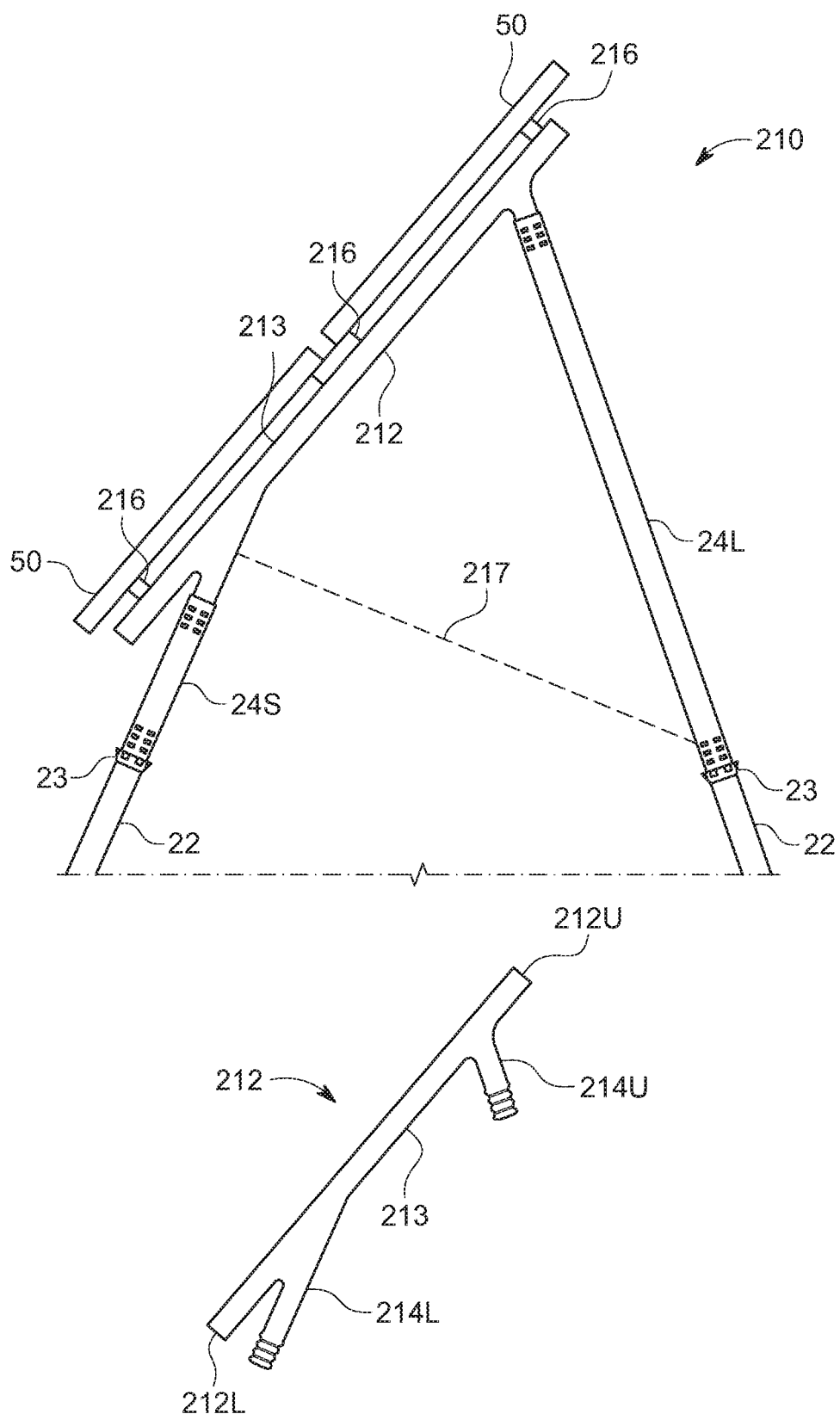
FIG. 14 shows yet another fixed-tilt solar array according to various embodiments.

Turning now to FIG. 14, this figure shows another fixed-tilt solar array 210 according to various embodiments. Like, array 180 shown in FIG. 11, the truss supporting array 210 consists of short and long truss legs made from screw anchors 22 and upper leg sections 24S, 24L. As shown, front leg 24S is substantially shorter than rear leg 24L. As with array 180, a straight line from the top of rear leg 24L to the top of front leg 24S will approximate the tilt angle of the array. Truss cap portions 182, 183 and tube 184 have been replaced with single truss cap 212 approximating the same structure with fewer connections. Truss cap 212 consists of elongated portion 213 having respective opposing ends 212L and 212U. A pair of connecting portions 214L and 214U project away from elongated portion 213 proximate to ends 212L and 212U. Once each upper leg section is sleeved over its coupler 23, connecting portions 214L and 214U are inserted into respective legs 24S and 24L, respectively. All points of overlap between legs 24S and 24L and connecting portions 214L and 214U, and between legs 24S and 24L and couplers 23 are crimped to lock them in place. If necessary, cable connection 217 may extend from truss cap 212 to rear leg 24L.

Figure 15:
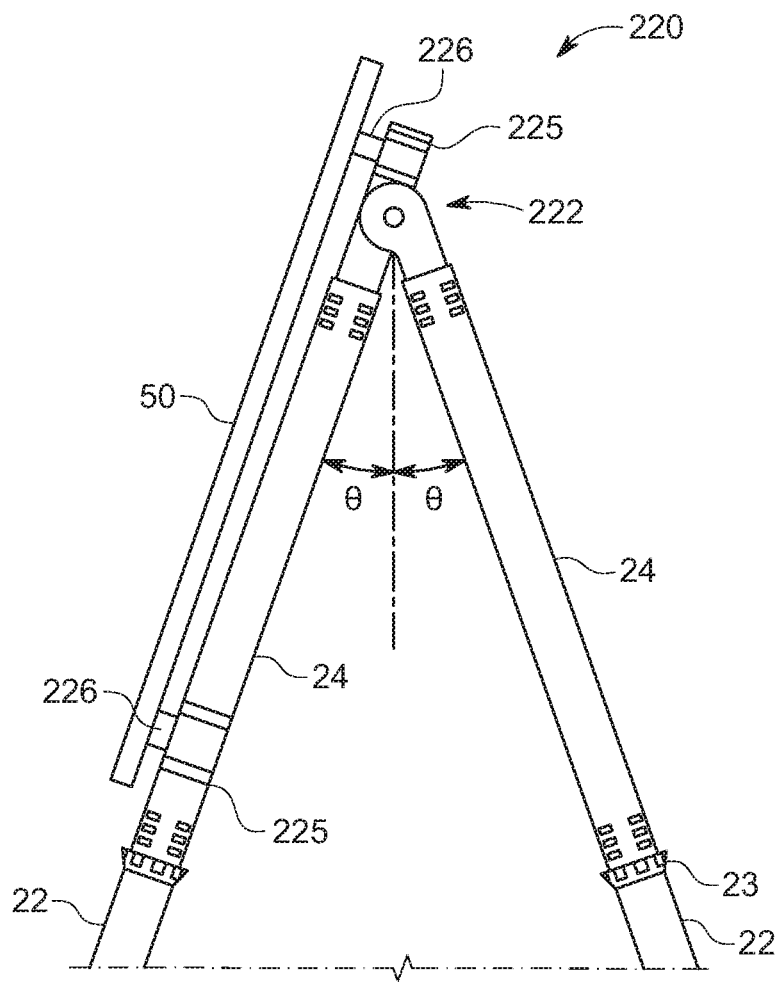
FIG. 15 shows an additional fixed-tilt solar array according to various embodiments.
Figure 15:
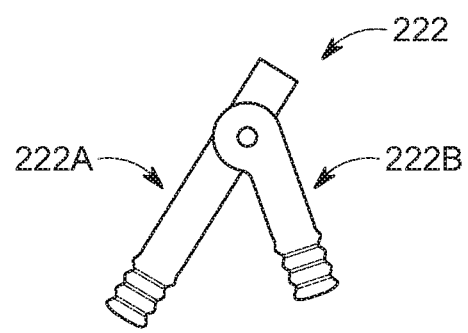

Turning now to FIG. 15, this figure shows still a further fixed-tilt array 220 according to various embodiments. As with other arrays according to various other embodiments, array 220 sits on a truss foundation constructed from screw anchors 22 and upper legs 24 joined via respective couplers 23. Anchors 22 may be driven at reciprocal angles to one another (e.g., ±20-degrees from the midline between them or ±70-degrees with respect to horizontal), such as angle Θ shown in the figure, or, alternatively, may be driven at different angles from one another. For example, the front screw anchor may be driven at the tilt angle while the rear anchor is driven at a less steep angle. In either case, the angle of the front truss leg will coincide with the tilt angle of the array. Truss cap 222 has an elongated main portion 222A terminating in a connecting portion and hinged portion 222B also terminating in a connecting portion. This enables truss cap 222 to be used with an infinite number of tilt and truss leg angle combinations. In various embodiments, the connecting ends of sections 222A and 222B are inserted into respective front and rear upper leg sections 24 and over driving couplers 23. Then, a crimping tool may be applied over the legs to form crimp joints between couplers 23 and upper legs 24 and between upper legs 24 and truss cap portions 222A and 222B, respectively. Leg connectors 225 are attached to the front truss leg and truss cap 222, or alternatively just to the front truss leg to support purlins 226. Purlins 226 are placed orthogonally across the front truss leg and/or front truss leg and truss cap 222, extending in the East-West direction to the next adjacent foundation in that row and held in place with leg connectors 225. Then, solar panels 50 are attached to the purlins.

It should be appreciated that the hinged geometry of truss cap 222 may be used with various other embodiments to accommodate different tilt angles and to correct for any misalignment between an intended leg angle and the actual angle. Also, in any of the fixed-tilt arrays shown herein, it may be desirable to orient one or more truss foundations orthogonally with respect to the rest to provide weak axis support. For example, in the South-facing arrays disclosed herein, one or more screw anchors may be driven to form an East-West oriented truss rather than North-South. Although the array has small cross section in the North-South direction, this may be needed resist seismic loads or static loads on sloped array sites. Similarly, in the East-West oriented array of FIGS. 10A/B, it may be desirable to have an additional screw anchor extending at one or both ends in the North or South direction to provide resistance to seismic loads and or static loads oriented in that direction. In some embodiments, this may be accommodated with a three-way truss cap with three connecting portions. Alternatively, cables or guy wires may be used to provide weak axis support at each end of the array or elsewhere along it.

It should also be appreciated that any of the South-facing fixed-tilt arrays discussed herein may include a sheet or section of reflective material attached to the back legs and extending from one foundation to the next. This may strengthen the resulting array by interconnecting one foundation to the next as well as allowing light to be reflected to the underside of a bi-facial module and/or to the face of an adjacent module.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A fixed-tilt solar array system comprising:
   a plurality of screw anchors;
   a plurality of hinge caps, each adapted to attach to an above ground end of one of the plurality of screw anchors;
   a first hinge assembly comprising a first support member hingedly connected to a second support member and adapted for a hinged connection to one of the hinge caps at each distal end of the assembly and to a second hinge assembly via one of the hinge caps;
   a first plurality of purlins extending transversely from the first support member of the first hinge assembly to a first support member of another adjacent hinge assembly in a common row; and
   a plurality of solar panels attached to the first plurality of purlins.

* * * * *